US006277476B1

(12) United States Patent
Shaw-Klein et al.

(10) Patent No.: US 6,277,476 B1
(45) Date of Patent: Aug. 21, 2001

(54) MATCHED INK/RECEIVER SET CONTAINING COLLOIDAL INORGANIC PARTICLES

(75) Inventors: Lori Shaw-Klein; Thomas W. Martin, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/127,000

(22) Filed: Jul. 31, 1998

(51) Int. Cl.[7] .......... B32B 3/00

(52) U.S. Cl. .......... 428/195; 106/31.65; 347/96; 427/256

(58) Field of Search .......... 347/96; 428/329, 428/195; 106/31.65, 31.6, 31.85; 427/256

(56) References Cited

U.S. PATENT DOCUMENTS

| | | | |
|---|---|---|---|
| 4,597,794 | 7/1986 | Kaisha . | |
| 4,649,064 | 3/1987 | Jones . | |
| 5,085,698 | 2/1992 | Ma et al. . | |
| 5,172,133 | 12/1992 | Suga et al. . | |
| 5,221,332 | 6/1993 | Kohlmeier . | |
| 5,352,736 | 10/1994 | Stofko et al. . | |
| 5,537,137 | 7/1996 | Held et al. . | |
| 5,562,975 | 10/1996 | Sugai et al. . | |
| 5,965,252 * | 6/1999 | Santo et al. | 428/329 |

FOREIGN PATENT DOCUMENTS

| | | |
|---|---|---|
| 775 596 A1 | 10/1996 | (EP) . |
| 759 365 A1 | 2/1997 | (EP) . |

OTHER PUBLICATIONS

"Silane Coupling Agents, 2d Ed" by Edwin P. Plueddemann (Plenum Press, 1982), pp. 31–114.

* cited by examiner

*Primary Examiner*—Bruce H. Hess
*Assistant Examiner*—Michael E. Grendzynski
(74) *Attorney, Agent, or Firm*—Harold E. Cole

(57) ABSTRACT

An ink jet ink/receiver set comprising:

a) an ink receiving layer containing a reactive coupling agent and deposited thereon b) an image formed from an ink jet ink containing a compound with mineral surfaces; wherein the reactive coupling agent reacts with the mineral surfaces in the ink.

11 Claims, No Drawings

MATCHED INK/RECEIVER SET CONTAINING COLLOIDAL INORGANIC PARTICLES

CROSS REFERENCE TO RELATED APPLICATIONS

This application is related to the following commonly owned U.S. application filed on even date herewith: U.S. Ser. No. of 09/126,866 of Martin and Bugner, titled "PIGMENTED INK JET INKS CONTAINING ALUMINUM STABILIZED COLLOIDAL SILICA", now U.S. Pat. No. 5,925,178.

FIELD OF THE INVENTION

This invention relates to an ink jet ink/receiver set and to a process for creating images by inkjet printing, in which the surfaces of inorganic particulates in the ink react with a coupling agent included within or on top of the ink receptive layer(s).

BACKGROUND OF THE INVENTION

Coupling agents are known to act as an adhesive between inorganic surfaces and polymers. For example, organofunctional silane coupling agents act as adhesion promoters between organic polymers and mineral surfaces. Less well known but also effective coupling agents include chromium complexes which are effective when used in combination with either silica or alumina surfaces.

While such coupling agents are most frequently used as adhesion primer layers between glass and polymeric films, they are also well known in coating technology. Typical paper and polymeric web coatings often contain combinations of polymers and inorganic particles such as silica. In order to ensure compatibility and adhesion between the polymeric matrix and silica particle, silane coupling agents or silanol modified polymers are sometimes used. In U.S. Pat. No. 5,562,975 (New Oji Paper Co., Ltd), a hot melt ink recording sheet is disclosed in which the ink receptive layer comprises a mixture of silanol-modified polyvinyl alcohol and amorphous silica. The '975 patent states: "The silanol groups of the modified polyvinyl alcohol chemically react with the pigment so as to enhance the mechanical strength of the ink-receiving layer". For the porous, non-glossy coatings described therein, there is a surfeit of silica particles such that it is safe to assume that by intention and in practice virtually all the silanol groups on the polyvinyl alcohol are fully reacted in the dried coating and would no longer be available to react with components of the printing ink.

Similarly, in EP 0 759 365 (New Oji Paper Co., Ltd), an inkjet recording material intended for use as stickers is disclosed. In this case, the silica particles are defined as either porous amorphous silica particles if a non-glossy film is desired, or colloidal silica particles if a glossier film is desired. Effective binder systems include either conventional polyvinyl alcohol or silicon-modified polyvinyl alcohol. Again, silanol groups on the polyvinyl alcohol react with silica surfaces in the coating, and are not available to react with ink components.

A somewhat different approach for use of silane coupling agents in ink receiving layers is described in U.S. Pat. No. 5,352,736 (Minnesota Mining and Manufacturing Company). In this case, a semi-interpenetrating network of a water soluble polymer and a non-water soluble polymer form the recording layer. The non-water soluble portion of the layer contains crosslinked silanol moieties which originate from added silane coupling agents. Once again, the reactive species are fully crosslinked in the dried film and so can not be available for reacting with ink species.

While no record exists of reactive ink-receiver combinations using chemistries described herein, some reactive combinations have been disclosed which are summarized below.

In U.S. Pat. No. 4,649,064 (Eastman Kodak Company), ink-receiver combinations are disclosed in which the ink contains a cross-linkable colorant/resin composition and the receiver layer contains a cross-linking agent which renders the printed areas abrasion-resistant, smear-resistant and waterfast. In this case, the reactive substance in the ink is a polymeric resin. While such an approach is somewhat effective, polymeric resin additives typically have the unfortunate characteristic of clogging ink nozzles which is not observed for inorganic colloidal additives to inks.

A similar approach is disclosed in U.S. Pat. No. 5,537,137 and EP 0 775 596 (both to E. I. DuPont de Nemours and Company) in which a reactive component is contained in the ink receiving layer. The reactive species is capable of crosslinking the coating itself as well as binding the colorant to the coating. The reactive species must be chosen so that it does not react until it is exposed to an external energy source such as heat or radiation after printing. Such an approach has distinct disadvantages due to the inconvenience of a required post-printing treatment.

Inks containing inorganic particles have been disclosed for inkjet printing applications. In U.S. Pat. No. 5,221,332 (Xerox Corporation), dye based inks containing silica particles are disclosed. The silica particles in the '332 patent are intended to enable increased drop volumes while printing. Combination of these inks with a specially designed receiver is not taught.

Copending, commonly owned, concurrently filed U.S. application Ser. No. 09/126,866 of Martin and Bugner, titled "PIGMENTED INK JET INKS CONTAINING ALUMINUM STABILIZED COLLOIDAL SILICA", now U.S. Pat. No. 5,925,178, describes ink additives comprising preferably aluminium stabilized colloidal silica in order to improve optical density and dry abrasion resistance.

There is, however, still a need for other mechanisms to further enhance water resistance and durability of images printed with inks containing inorganic particles.

SUMMARY OF THE INVENTION

The present invention discloses a reactive ink-receiver combination giving excellent durability and water resistance. The ink contains a mineral surface, preferably by the presence of an inorganic particulate oxide, and most preferably by the inclusion of colloidal silica. The ink receptive layer contains a coupling agent, preferably an organofunctional coupling agent capable of reacting with the mineral surfaces.

In one aspect of the invention, there is provided an ink jet ink/receiver set comprising:

a) an ink receiving layer containing a reactive coupling agent and deposited thereon b) an image formed from an ink jet ink containing a compound with mineral surfaces; wherein the reactive coupling agent reacts with the mineral surfaces in the ink.

In another aspect of the invention there is disclosed a method of preparing ink jet ink images, comprising the steps of:

a) providing an ink jet ink containing a carrier, a pigment, and a compound with mineral surfaces;

b) providing an ink receiving layer on a support, said ink receiving layer containing a reactive coupling agent; and c) image-wise depositing the ink on the ink receiving layer.

Yet another aspect of the invention discloses a method of making an ink jet ink/receiving layer set, comprising the steps of:

a) providing an ink jet ink containing a carrier, a pigment, and a compound with mineral surfaces;

b) providing a coating formulation containing a reactive coupling agent;

c) applying the coating formulation to a support;

d) allowing the coating to dry; and e) image-wise depositing the ink on the ink receiving layer.

DESCRIPTION OF THE INVENTION

The present invention is designed to enhance the water resistance and abrasion resistance of images printed using inks containing colloidal inorganic particles. Coupling groups may be introduced into the ink receptive layer by direct addition of coupling agents to the material(s) comprising at least the topmost surface of the ink receptive layer, or by functionalizing the ink receptive materials with coupling groups. Silica particles may be added to inks in the form of colloidal silica or other particulate silica, provided that the silica particles do not interfere with the jettability of the inks or the quality of the printed image.

The resin contained in the coating can be pre-reacted to form silanol-functional sites. Examples of silanol-functionalized polymers include, but are not limited to, Kuraray R-Polymers, which are silanol modified polyvinyl alcohol (Kuraray Co., Ltd); silanol-modified gelatin (Crodasone C™, available form Croda Colloids Ltd.); or silanol-modified wheat protein (Crodasone W™, also available from Croda Colloids Ltd.)

The reactivity of the system depends on the inclusion of a coupling agent, preferably an organofunctional silane coupling agent. Organofunctional silane coupling agents are designed to react with both an organic resin through the organofunctional group and with a mineral surface through hydrolyzable groups. Various hydrolyzable groups can be selected to yield molecules such as alkoxysilanes, chlorosilanes, acetoxysilanes, or trialkoxysilanes. Preferred hydrolyzable groups are lower (1–5 C atoms) trialkoxysilanes due to their fast reactivity, since any reaction with ink components must proceed while water is still available before the ink is completely dry. Common organofunctional groups include halogens; carbon-carbon double bonds, amines, epoxies, mercaptans, carboxylic acids or alcohols. A detailed description of the preparation and use of such materials is given in "Silane Coupling Agents, 2d Ed" by Edwin P. Plueddemann (Plenum Press, 1982), pages 31–53. Representative commercial coupling agents include vinyltrimethoxysilane, chloropropyltrimethoxysilane, 3-glycidoxypropyltimethoxysilane, 3-methacryloxypropyltrimethoxysilane, 3-aminopropyltriethoxysilane, N-2-aminoethyl-3-aminopropyltrimethoxysilane, 3-mercaptopropyltrimethoxysilane, 3-(N-styrylmethyl-2-aminoethylamino)propyltrimethoxysilane hydrochloride, and b-(3,4-epoxycyclohexyl)ethyltrimethoxysilane. In this case, preferred silane coupling agents include aminopropyl trimethoxysilane or glycidyloxypropyl trimethoxysilane for ease of handling and reactivity. The coupling agent may be added directly to the coating formulation for the ink receiving layer, or coated in a dilute layer over the coating formulation.

If an ink receptive material contains more than one layer, the coupling agent or silanol-containing material may reside only in the top (closest to the free surface) layer. It is important that the coupling agent is positioned at the free surface so that it will be in direct contact with ink components during printing, so that the desired effect will take place. The amount of coupling agent in the receiver should be sufficient for reaction with the mineral surfaces in the ink to take place.

Ink receptive materials for inkjet printing or other liquid marking processes typically employ layers comprising materials which are particularly receptive to the solvent or carrier making up the ink. For example, when inks are based primarily on water as they are for most commercially available desk top inkjet printers, such a layer could be comprised of a hydrophilic material such that its capacity for swelling in the ink solvent allows the printed areas to become apparently dry quickly and also prevents flooding of the ink on the surface. Alternatively, such a layer could be comprised primarily of particulate materials such that the coated layer is highly porous and is therefore able to carry the ink away from the printed surface quickly. This also gives the impression of fast drying and limits any flooding of the surface in areas of high ink laydown.

While porous non-glossy ink receiving layers could effectively be used for this invention, glossy receivers are preferred for high quality imaging applications.

The use of film-forming hydrophilic colloids as binders for such glossy ink receiving elements is well known. Examples of hydrophilic materials which form excellent ink-receptive layers for aqueous inks include but are not limited to polyvinyl alcohols and their derivatives, poly (vinyl pyrrolidone), sulfonated or phosphated polyesters, cellulose ethers and their derivatives, poly(2-ethyl-2-oxazoline), gelatin, casein, zein, albumin, chitin, chitosan, dextran, pectin, collagen derivatives, collodian, agar-agar, arrowroot, guar, carrageenan, tragacanth, xanthan, rhamsan, sulfonated polystyrenes, polyacrylamides and their derivatives, polyalkylene oxides, hydrophilic acrylates and their copolymers, and the like. A combination of such materials may be used and in fact may be preferred in order to obtain phase separation or some other effect associated with less glossy images.

The hydrophillic film forming binder may also include a crosslinker. Crosslinkers such as carbodiimides, polyfunctional aziridines, melamine all be considered.

Inks useful for ink jet recording processes generally comprise at least a mixture of a solvent and a colorant. The preferred solvent is de-ionized water, and the colorant is either a pigment or a dye. Pigments are often preferred over dyes because they generally offer improved waterfastness and lightfastness on plain paper.

Pigmented inks are most commonly prepared in two steps:

1. a pigment milling step in which the as-received pigment is deaggregated into its primary particle size, and 2. a dilution step in which the pigment mill grind is converted into a useable ink.

Processes for preparing pigmented ink jet inks involve blending the pigment, an additive known as a stabilizer or dispersant, a liquid carrier medium, grinding media, and other optional addenda such as surfactants and defoamers. This pigment slurry is then milled using any of a variety of hardware such as ball mills, media mills, high speed dispersers, and roll mills.

In the practice of the present invention, any of the known pigments can be used. The exact choice of pigment will depend upon the specific color reproduction and image stability requirements of the printer and application. For a list of pigments useful in ink jet inks, see U.S. Pat. No. 5,085,698, column 7, line 10 through column 8, line 48.

The liquid carrier medium can also vary widely and again will depend on the nature of the ink jet printer for which the inks are intended. For printers which use aqueous inks, water, or a mixture of water with miscible organic co-solvents, is the preferred carrier medium.

The dispersant is another important ingredient in the mill grind. Although there are many know dispersants known in the art, the best dispersant will be a function of the carrier medium and also often varies from pigment to pigment. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Our most preferred dispersant is oleoyl methyl taurine (OMT) sodium salt, obtained from Synthetic Chemical Div. of Eastman Kodak Co.

In the dilution step, other ingredients are also commonly added to pigmented ink jet inks. Cosolvents (0–20 wt %) are added to help prevent the ink from drying out or crusting in the orifices of the printhead or to help the ink penetrate the receiving substrate, especially when the substrate is a highly sized paper. Preferred cosolvents for the inks of the present invention are glycerol, ethylene glycol, and diethylene glycol, and mixtures thereof, at overall concentrations ranging from 5 to 15 wt %.

Improved image quality, higher optical density and improved rub resistance is obtained when aluminum-stabilized colloidal silica, such as Ludox AM™ (DuPont). Preferred concentrations range form 0.50 to 15.0% by weight.

A biocide (0.01–1.0 wt %) may be added to prevent unwanted microbial growth which may occur in the ink over time. A preferred biocide for the inks of the present invention is Proxel GXL™ (obtained from Zeneca Colours) at a final concentration of 0.05–0.5 wt %.

Additional additives which may optionally be present in ink jet inks include conductivity enhancing agents, anti-kogation agents, drying agents, and defoamers.

EXAMPLES

| Mill Grind | |
|---|---|
| Polymeric beads, mean diameter of 50 μm (milling media) | 325.0 g |
| Black Pearls 880 (Cabot Chemical Company) (pigment black 7) | 30.0 g |
| Oleoyl methyl taurine, (OMT) sodium salt | 10.5 g |
| Deionized water | 209.5 g |
| Proxel GLX ™ (biocide from Zeneca) | 0.2 g |

The above components were milled using a high energy media mill manufactured by Morehouse-Cowles Hochmeyer. The mill was run for 8 hours at room temperature. The particle size distribution was determined using a Leeds and Northrup Ultra Particle Size Analyzer (UPA). The D50(50% of the particles were smaller than this value) of the millgrind was about 0.080 um. Millgrinds were prepared in a similar manner substituting Hansa Brilliant Yellow (Hoecsht, pigment yellow 74), Sunfast Magenta 122(Sun Chemical, pigment red 122) and Bis(phthalocyanylalumino)tetraphenyldisiloxane (cyan pigment) manufactured by Eastman Kodak in the millgrind formulation. The D50 for the pigment yellow 74 millgrind was about 0.010 um, the pigment red 122 millgrind was about 0.010 um and the cyan pigment millgrind was about 0.011 um.

Ink

An aliquot of each of the pigment millgrinds described above to yield 2.0 g (black), 2.25 g (yellow or cyan), or 3.25 g (magenta) pigment was mixed with: 5.0 grams diethylene glycol, 5.0 grams glycerol, colloidal silica dispersion (Ludox AM™, DuPont) to yield 4.0 grams silica, and balance deionized water to yield 100 grams of ink color.

Ink Receiving Layers

Solutions of water soluble hydrophilic polymers (5%–10% by weight) were prepared in de-ionized water. If required, silane coupling agents and a nonionic surfactant (10 G, Dixie Chemical) were added. The solution was coated by conventional bead coating, either in single layer or slide-coating format, on polyethylene coated photobase paper which was treated by corona discharge in order to enhance adhesion.

The coatings were thoroughly dried to a web exit temperature of approximately 35° C. In the following examples, "Layer 1" refers to the coating composition which lies directly on top of the paper, while "Layer 2", if used, refers to an overcoat material nearest the free surface.

The coatings were tested by loading the silica containing pigmented inks into an Epson 400 printer and generating a test target of 100% density cyan, magenta, yellow and black patches, as well as mixed color patches (200% coverage) of red, green and blue. The water resistance was evaluated by measuring the optical density of each primary color patch, immersing the printed target in room-temperature deionized water for five minutes with light agitation, and remeasuring the optical density of each patch after completely drying. The waterfastness is recorded as (the ratio of optical density after immersion:optical density before immersion)×100%.

Comparative Example 1*a*–6*a*

| Comparative Example | Layer 1 Composition | Layer 1 Coverage, g/m^2 | Layer 2 Composition | Layer 2 Coverage, g/m^2 |
|---|---|---|---|---|
| 1a | Gelatin | 7.5 | Gelatin | 1.1 |
| 2a | " | " | PVA | " |
| 3a | " | " | PVP | " |
| 4a | " | " | HEC | " |
| 5a | " | " | Gelatin, pH 3.5 | " |
| 6a | PVA | 8.6 | — | — |

Gelatin: Type IV non-deionized gelatin, (Eastman Gelatine Co.)
PVA: Polyvinyl alcohol, Elvanol 71-30, (DuPont)
PVP: Poly(vinyl pyrrolidone) K-90, (ISP)
HEC: Hydroxyethyl cellulose Cellosize ™ QP-40, (Union Carbide Corporation)
Gelatin pH 3.5: Type IV non-deionized gelatin (Eastman Gelatin Co.), adjusted to pH 3.5 by HCl addition

| | Waterfastness (% retained): | | | |
|---|---|---|---|---|
| Comparative Example | Cyan | Magenta | Yellow | Black |
| 1a | 61.1 | 50.0 | 88.7 | 98.3 |
| 2a | 32.4 | 52.1 | 71.1 | 84.5 |
| 3a | 7.8 | 36.9 | 87.1 | 90.9 |
| 4a | 7.9 | 5.5 | 2.6 | 4.4 |
| 5a | 83.1 | 79.5 | 96.6 | 99.5 |
| 6a | 28.2 | 83.1 | 19.8 | 39.6 |

Examples 1–12

| Example | Layer 1 Composition | Layer 1 Coverage, g/m^2 | Layer 2 Composition | Layer 2 Coverage, g/m^2 |
|---|---|---|---|---|
| 1 | Gelatin | 7.5 | Gelatin/APTMS, 90/10 | 1.1 " |
| 2 | " | " | Gelatin/GPTMS, 90/10 | " |
| 3 | " | " | Gelatin/VTMS, 90/10 | " |
| 4 | " | " | PVA/APTMS, 90/10 | " |
| 5 | " | " | PVA/GPTMS, 90/10 | " |
| 6 | " | " | PVA/VTMS, 90/10 | " |
| 7 | " | " | Silanol PVA | " |
| 8 | " | " | PVP/GPTMS, 90/10 | " |
| 9 | " | " | HEC/GPTMS, 90/10 | " |
| 10 | " | " | Gelatin/APTMS, 90/10; pH 3.5* | " |
| 11 | " | " | Gelatin/GPTMS 90/10; pH 3.5* | " |
| 12 | Silanol PVA | 8.6 | — | — |

APTMS: 3-Aminopropyltrimethoxysilane (Aldrich Chemical Company)
GPTMS: 3-Gylcidoxypropyltrimethoxysilane (Aldrich Chemical Company)
VTMS: Vinyltrimethoxysilane (Aldrich Chemical Company)
Silanol PVA: Silanol modified polyvinyl alcohol, Kuraray R-1130 (Kuraray Ltd)
*pH of Gelatin/Silane combinations were adjusted to 3.5 using HCl with both gelatin and silane coupling agent present.

| | Waterfastness (% retained): | | | | |
|---|---|---|---|---|---|
| Example | Cyan | Magenta | Yellow | Black | Compare with example . . . |
| 1 | 90.0 | 95.9 | 94.0 | 94.4 | 1a |
| 2 | 109.3 | 87.8 | 91.2 | 93.7 | " |
| 3 | 57.1 | 69.9 | 91.6 | 98.3 | " |
| 4 | 90.8 | 88.0 | 98.0 | 89.8 | 2a |
| 5 | 50.0 | 59.4 | 87.6 | 96.6 | " |
| 6 | 70.2 | 56.7 | 89.8 | 88.1 | " |
| 7 | 68.9 | 62.1 | 76.5 | 86.9 | " |
| 8 | 61.5 | 100.0 | 98.6 | 99.5 | 3a |
| 9 | 38.4 | 34.4 | 93.5 | 70.6 | 4a |
| 10 | 103.8 | 100.6 | 96.1 | 97.9 | 5a |
| 11 | 103.7 | 85.7 | 95.0 | 95.4 | " |
| 12 | 75.7 | 88.0 | 64.5 | 93.2 | 6a |

These examples demonstrate that addition of a coupling agent or functionality improves the waterfastness of printed areas. While acid-base interactions play some role in waterfastness, examples 10 and 11 show that the silane functionality also improves waterfastness markedly. The preferred coupling agent depends on both polymer binder choice and ink color. Finally, it is clear that the coupling agent does not necessarily need to form a bond with the ink-receiving polymer in order to be effective. This is illustrated by Example 8. Poly(vinyl pyrrolidone) possesses no functional groups which are expected to interact with the epoxy group on GPTMS, yet addition of the coupling agent shows marked improvement in water resistance.

The invention has been described in detail with particular reference to certain preferred embodiments thereof, but it will be understood that variations and modifications can be effected within the spirit and scope of the invention.

What is claimed is:

1. An ink jet receiver comprising:

a) an ink receiving layer containing a reactive coupling agent and deposited thereon b) an image formed from an ink jet ink containing aluminum stabilized colloidal silica; said reactive coupling agent having been reacted with said aluminum stabilized colloidal silica through hydrolyzable groups.

2. The ink jet receiver of claim 1 wherein the coupling agent comprises organo-silane functional groups.

3. The ink jet receiver of claim 2 wherein the coupling agent is aminopropyl trimethoxysilane or glycidyloxypropyl trimethoxysilane.

4. The ink jet receiver of claim 1 wherein the coupling agent is 3-aminopropyltrimethoxysilane.

5. The ink jet receiver of claim 1 wherein the ink receiver comprises more than one layer.

6. The inkjet receiver of claim 1 wherein said ink receiving layer is provided on a support.

7. An ink jet receiver comprising:

a support;

on the support, an ink jet ink receiving layer containing a reactive coupling agent; and deposited on the ink receiving layer, an image formed by a pigmented ink jet comprising a carrier, a pigment, and aluminum stabilized colloidal silica, said reactive coupling agent having been reacted with said aluminum stabilized colloidal silica through hydrolyzable groups.

8. A method of preparing ink jet ink images, comprising the steps of:

a) providing an ink jet containing a carrier, a pigment, and aluminum stabilized colloidal silica, b) proving an ink receiving layer on a support, said ink receiving layer containing a reactive coupling agent, said reactive coupling agent having been reacted with said aluminum stabilized colloidal silica through hydrolyzable groups; and c) image-wise depositing the ink on the ink receiving layer.

9. A method of making an ink jet ink/receiving layer set, comprising the steps of:

a) providing an ink jet containing a carrier, a pigment, and aluminum stabilized colloidal silica, b) providing a coating formulation containing a reactive coupling agent, said reactive coupling agent having been reacted with said aluminum stabilized colloidal silica through hydrolyzable groups;

c) applying the coating formulation to a support;

d) allowing the coating to dry; and e) image-wise depositing the ink on the ink receiving layer.

10. The method of claim 9 wherein the coating formulation consists essentially of a carrier and a reactive coupling agent and is applied on top of a first coating which may be the same or different from the coating formulation.

11. An ink jet ink/receiver set made according to the method of claim 8, 9, or 10.

* * * * *